US008472093B2

(12) United States Patent
Purohit et al.

(10) Patent No.: US 8,472,093 B2
(45) Date of Patent: Jun. 25, 2013

(54) AUTOMATED SOURCING FOR MULTIPLE PRINTING PRESS, MULTIPLE WEB PRINTING

(75) Inventors: Amarnath Purohit, Rochester, NY (US); Charles R. Myers, Penfield, NY (US); Lewis S. Snow, La Crescenta, CA (US); Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 780 days.

(21) Appl. No.: 12/608,076

(22) Filed: Oct. 29, 2009

(65) Prior Publication Data

US 2011/0102866 A1 May 5, 2011

(51) Int. Cl.

| | |
|---|---|
| ***G06F 3/12*** | (2006.01) |
| ***G06F 17/00*** | (2006.01) |
| ***G06F 3/00*** | (2006.01) |
| ***G06K 15/00*** | (2006.01) |
| ***G07Q 40/00*** | (2006.01) |
| ***G06Q 20/00*** | (2012.01) |

(52) U.S. Cl.
USPC ........ 358/500; 358/1.15; 358/1.13; 358/1.14; 705/400; 705/37; 705/80; 715/744

(58) Field of Classification Search
USPC ............... 358/1.15, 402, 1.13, 1.16; 705/400, 705/37, 80; 715/744
See application file for complete search history.

(56) References Cited

U.S. PATENT DOCUMENTS

| | | | | |
|---|---|---|---|---|
| 5,970,304 | A | 10/1999 | Stemmle | |
| 6,032,004 | A | 2/2000 | Mirabella, Jr. et al. | |
| 6,351,316 | B2 * | 2/2002 | Saito et al. | 358/1.15 |
| 6,434,272 | B1 * | 8/2002 | Saarelma | 382/224 |
| 7,046,383 | B1 * | 5/2006 | Ueda et al. | 358/1.15 |
| 7,800,768 | B2 * | 9/2010 | Yamada | 358/1.13 |
| 2002/0152183 | A1 * | 10/2002 | Soares et al. | 705/400 |
| 2006/0085318 | A1 | 4/2006 | Cohoon | |

* cited by examiner

*Primary Examiner* — Akwasi M Sarpong
(74) *Attorney, Agent, or Firm* — Gibb & Riley, LLC

(57) ABSTRACT

A machine-implemented process determines web press printing capabilities and costs of different printing organizations using a processor. The printing capabilities comprise a number of printing units and a number of supply roll stands supplying continuous print media to the printing units. A printing request is received from a print customer through a graphic user interface. The printing request is evaluated using the processor to determine printing request requirements. A comparator compares the printing request requirements with the printing capabilities and costs to identify capable printing organizations of the different printing organizations that have abilities to process the printing request. The processor calculates different print choices and costs based on the printing capabilities and costs of the capable printing organizations and outputs the different print choices and costs to the print customer through the graphic user interface.

12 Claims, 8 Drawing Sheets

AUTOMATED SOURCING FOR MULTIPLE PRINTING PRESS, MULTIPLE WEB PRINTING

BACKGROUND AND SUMMARY

Embodiments herein generally relate to web printing for books, newspaper, magazines, business forms and other large volume printing, and more particularly to methods and apparatuses that determine web press printing capabilities and costs of different printing vendors.

Reverse auctioning tools for print procurement allow document advisors (DA) to generate savings for customers by selecting and awarding print jobs to vendors who offer the lowest pricing and optimum production methods, based upon contractual rates and capability (ratecards) submitted by vendors.

The current business model and practices to leverage web-type (continuous print media roll-type) printing presses are limited to single web (single media roll) input. In the absence of multiple web press cost projection functionality, printing vendors or document advisors use non-standard tools to store and analyze data to provide pricing information. However, by using non-standard tools, printing vendors and print buyers are unable to use sourced ratecards (ratecards are the price point where suppliers provide the rates for each service during automated sourcing engagement). This results in uneven pricing and the inability to benchmark savings opportunities.

Embodiments herein provide implementations of web press determination and signature processes, devise profile information needed to support the processes, and devise unique impressions, paper, ink, and press platemaking formulas for all new press types.

The embodiments herein increase savings for customers and generate additional revenue for those printing vendors tied to a fee structure based upon procurement volume. The growth of web printing for books, newspaper, magazines, business forms and other large volume print has made web press a major part of the printing industry.

In view of these issues, embodiments herein provide a machine-implemented method that determines web press printing capabilities and costs of different printing organizations using a processor. The printing capabilities comprise the number of printing units and the associated number of supply roll stands that supply continuous print media to the printing units. The method can determine the web press printing capabilities using an automated interactive communication system established between the printing units, the supply roll stands, and the processor. The method maintains such printing capabilities and costs of the different printing organizations as rate cards within a computer-readable storage medium operatively connected to the processor.

The method can then receive a printing request from a print customer through a graphic user interface operatively connected to the processor. The method automatically evaluates the printing request using the processor to determine printing request requirements. Such printing request requirements comprise the number of colors to be printed and the number of pages to be printed. The method can automatically compare the printing request requirements with the rate cards (using a comparator operatively connected to the processor) to identify capable printing organizations that have the ability to process the printing request, from the list of all potential different printing organizations.

The method can automatically calculate different print choices and costs based on the rate cards of the capable printing organizations (using the processor) and automatically outputs the different print choices and costs to the print customer through the graphic user interface. The different print choices can include different print qualities, different completion times, different printing widths, different printing run lengths, different numbers of print colors, and different finishing options for the print job. Each of the printing units only prints a single color at a time. By using different combinations of multiple printing units and multiple supply rolls, many colors can be printed in a single production run. The method calculates the different print choices considering different combinations of the printing units and the supply roll stands.

Apparatus embodiments are also utilized herein. One such apparatus includes a processor that determines the web press printing capabilities and costs of the different printing organizations and a computer-readable storage medium operatively connected to (directly or indirectly connected to) the processor. The processor determines the web press printing capabilities through an automated interactive communication system between the printing units, the supply roll stands, and the processor.

The computer-readable storage medium maintains the printing capabilities and costs of the different printing organizations as rate cards. The computer-readable storage medium also contains instructions (that can be stored as computer code) that the processor executes to perform the processes described herein.

The graphic user interface is operatively connected to the processor. The graphic user interface receives a printing request from a print customer, the processor automatically evaluates the printing request to determine the printing request requirements. The comparator is also operatively connected to the processor. The comparator automatically compares the printing request requirements with the rate cards to identify ones of the different printing organizations that have abilities to process the printing request as capable printing organizations.

The processor automatically calculates different print choices and costs based on the rate cards of the capable printing organizations. The processor calculates such different print choices and costs by considering different combinations of the printing units and the supply roll stands. The graphic user interface automatically outputs such different print choices and costs to the print customer.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, the current business model and practices to leverage web-type (continuous print media roll-type) printing presses are limited to single web (single media roll) input. Therefore, the embodiments herein provide press determination and signature methods to combine multiple printing units (multiple web rolls) as part of web presses where each printing unit contains an inking system, a dampening system, a plate cylinder, a blanket cylinder, and an impression cylinder. The embodiments increase flexibility and provide higher productivity through higher pagination with high print quality closed-loop monitoring, in-folder finishing, and faster linear paper speeds.

The embodiments herein provide full web heatset, which prints both sides of the web at the same time and that has a drying modality that allows for the use of coated paper, faster press runs, and higher quality (particularly in full color pictures and illustrations). The embodiments herein also provide full web coldest which prints both sides of the web at the same time and has a drying modality that is limited to uncoated paper, has slower press runs, and lower quality of full-color images. Further, embodiments herein provide a half web heatset option that is the same as the full web heatset, but with a smaller web width, cutoff (length), and pages per signature capabilities.

Figure 1:
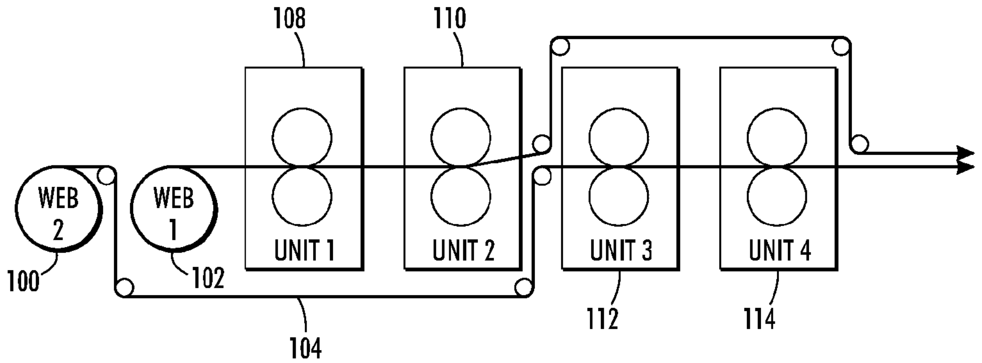
FIG. 1 is a side-view schematic diagram of a printing organization having multiple web rolls and multiple printing presses according to embodiments herein.

FIG. 1 illustrates a two-web (104, 106) 4 printing unit (108, 110, 112, 114) web press. The multiple roll stands 100, 102 supply webs 104, 106 of continuous print media to any of the multiple printing units 108, 110, 112, 114. Such roll stands and continuous print media printing units are well-known by those ordinarily skilled in the art (see, for example U.S. Pat. No. 5,970,304, the complete disclosure of which is incorporated herein by reference) and such elements are not discussed herein in detail to focus the reader on the salient features of the embodiments herein.

Different combinations of supply webs and printing units can be combined to form a "signature." Therefore, for example, if the print media is four times wider than the page size and the diameter of the printing drum is four times longer than the page size, each printing unit can print a signature of 16 pages. If two printing units are used in combination, each can print a different color on the 16 pages. This would allow a two-color 16 page "signature."

While a certain number of roll stands and printing units are illustrated in FIG. 1, those ordinarily skilled in the art would understand that there could be more or less of each device in any given setup. The printing organization illustrated in FIG. 1 is in a configuration that can simultaneously print two different 16-page signatures, each with two colors on both sides of the web.

Figure 2:
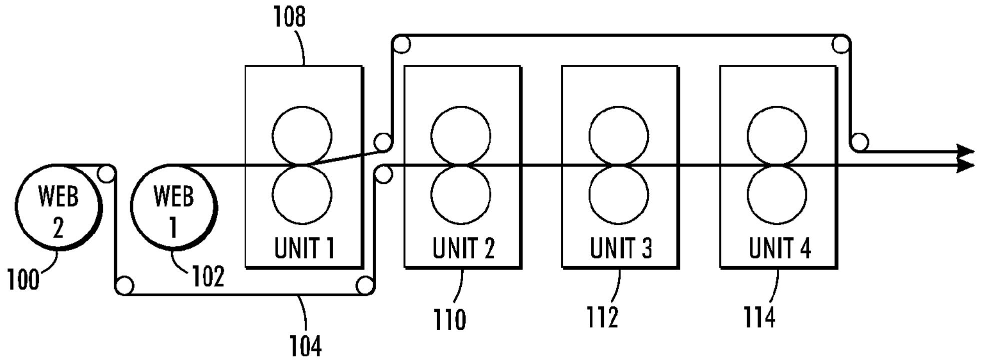
FIG. 2 is a side-view schematic diagram of a printing organization having multiple web rolls and multiple printing presses according to embodiments herein.

The same press could be configured as illustrated in FIG. 2 to print one 16-page single color signature and one 16-page 3 color signature by changing where the webs enter and exit the printing units. For example, rather than feeding web 106 through printing units 108 and 110 to print multiple colors upon web 106 (as it is done in FIG. 1); in FIG. 2, web 106 is fed only through the single printing unit 108 which prints a single color upon web 106. Similarly, rather than feeding web 104 through two printing units 112 and 114 to print two colors on web 104 (as is done in FIG. 1); in FIG. 2, web 104 is fed through three printing units 110, 112, and 114 to print three colors upon web 104. Again, while a limited number of printing units and webs is illustrated in FIGS. 1 and 2, those ordinarily skilled in the art would understand that many different numbers of printing units and webs can be utilized to establish many different color options.

The differences between various web presses include different web widths, cutoff lengths, speeds and configurations. For example, web press widths can vary from 11" up to 56" (and wider). The web presses have commonalities such as infeed, printing units, and delivery. Web presses are categorized according to many different factors. Some are used for high volume printing such as publication, newspaper, book, advertising etc., while others are used for lower volume printing such as business forms, small publications, etc. Different web presses can operate at different speeds; can print using heatset-ink or coldset-ink; can use different sheeters and folders; can print one or both sides of web at the same time, can print "half-web" (meaning web widths in the 25" range) or "full-web" (meaning web widths in the range between 33"-56"); can print roll to roll, roll to sheet, or roll to fold; etc. Available inline finishing options include perforation, scoring, folding, saddle-stitching, three-knife trimming, etc.

Web pressing is divided into two major operational segments: press preparation and press running. Press preparation operations include all major elements as services including color units, web rolls, inks, etc. The variables affecting ink consumption are based on setup as part of the impression calculation, the different kinds of presses, and the variations between brands of ink and paper.

Figure 3:
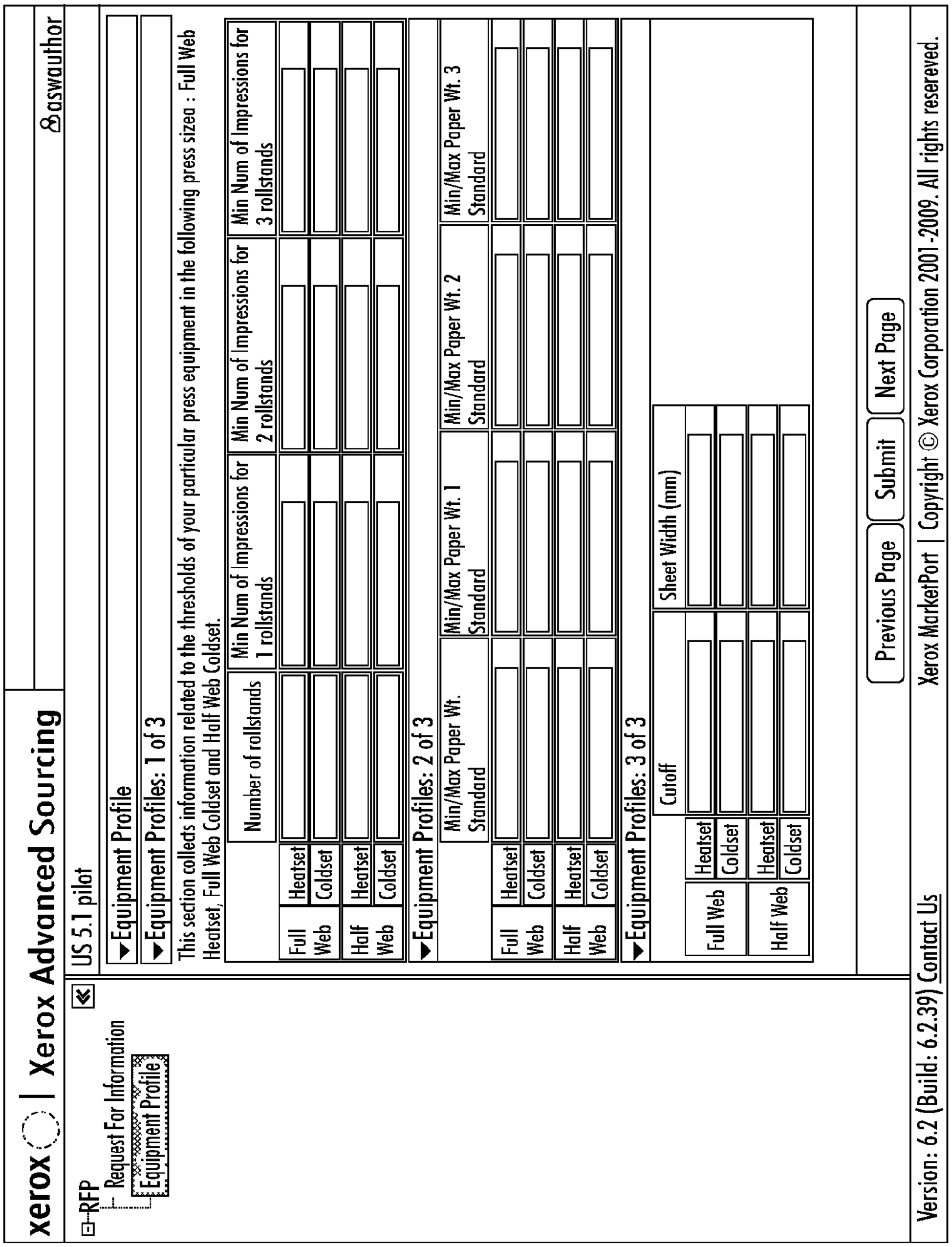
FIG. 3 is a schematic diagram of a graphic user interface according to embodiments herein.

FIG. 3 illustrates one exemplary graphic user interface 200 that can be used by embodiments herein to gather such information from print organizations regarding their web press capabilities. For example, graphic user interface 200 includes fields for the number of roll stands, the minimum number of impressions per roll stand, the minimum/maximum paperweight, the cutoff, the sheet width, etc.

Multiple web press workflows are made available to the DA (Document Advisor) by the embodiments herein depending entered configuration. Vendors (printing organizations) who possess such multiple web press capability map their equipment to the multiple web press functionality through the graphic user interface 200.

Once such information is obtained from the printing organizations, vendor preferences are created for each vendor based on the specific regions of sourcing. After reviewing the RFI (Request for Information) submittals from print customers (printing requests), the list of potential printing organizations is automatically or manually culled. Those printing organizations remaining enter pricepoints either manually, or automatically through pre-established ratecards. These remaining printing organizations can be analyzed by sourcing consultants and the list can be further culled. Interaction among the consultants and remaining suppliers can result in review and adjustment of pricepoints in a reverse auction process. Finally a selected printing organization is chosen by the print customer to print the print job. Thus, the print customer enters job specifications and after an automated and/or manual process, a list of vendors capable of producing the job is created and a preview price is calculated based on the rates collected during the sourcing effort.

With embodiments herein, press type is determined separately for each vendor based on various preferences. If a vendor can print the job using multiple presses then the most economical press will be selected as the press type for that vendor. For example, FIG. 4 illustrates a sequence diagram for the press type determination.

Figure 4:
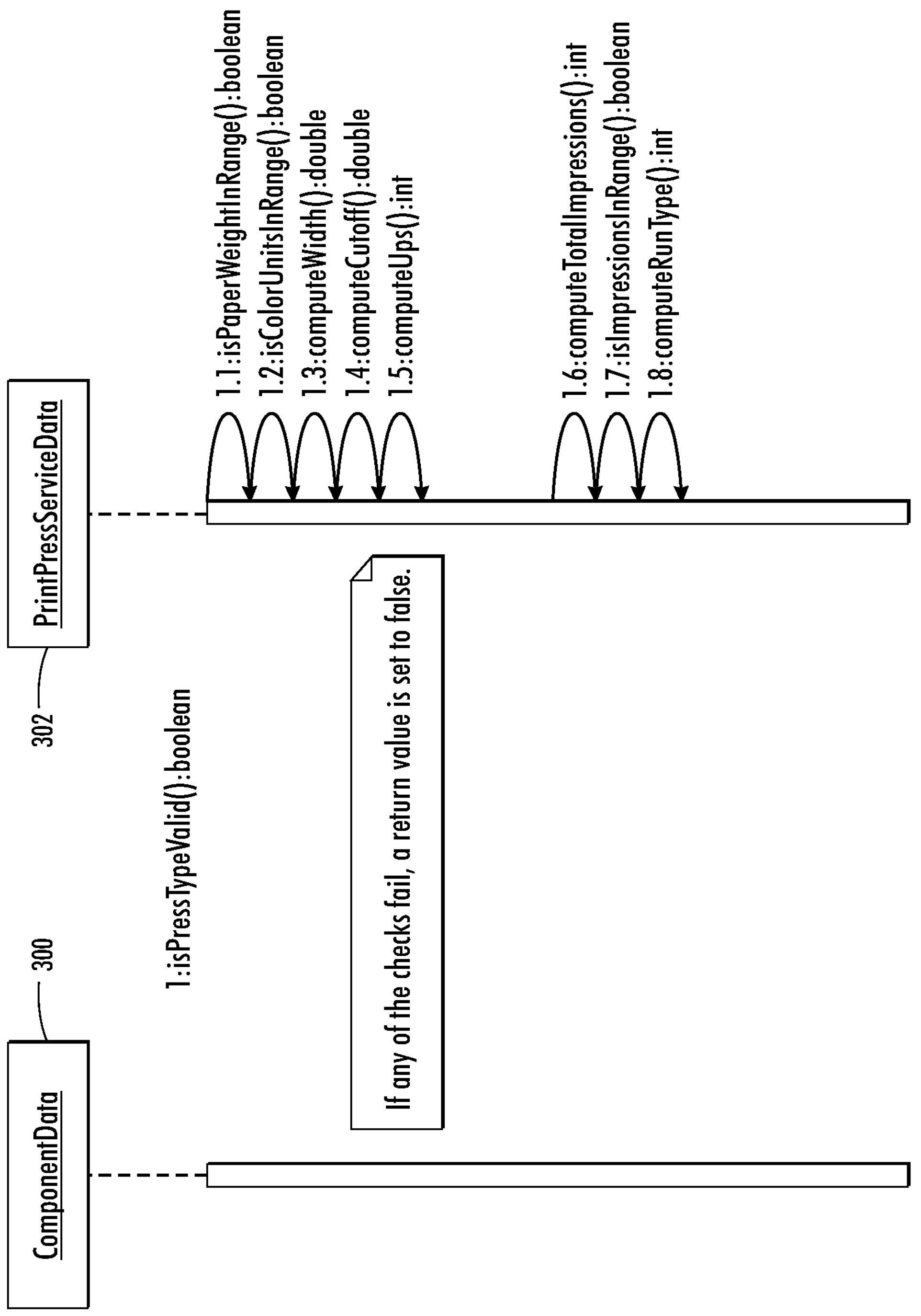
FIG. 4 is a flow diagram illustrating aspects of embodiments herein.

In FIG. 4, the component data 300 communicates with a print press service data 302 to establish whether the press type is valid (to establish whether the printing organization has the capability to produce the print job requested by the print customer). In this process, the embodiments herein determine whether all of the following characteristics of a printing organization match the specifications of the print customer's printing request: the paper weight, the number of color units, the sheet width, the cutoff, the units per signature (Ups), the total number of impressions, the impression range, and run type. If all the specifications of the print customer's printing request are matched by a printing organization, that printing organization is considered to be a capable printing organization which can participate in the reverse auction process.

Figure 5:
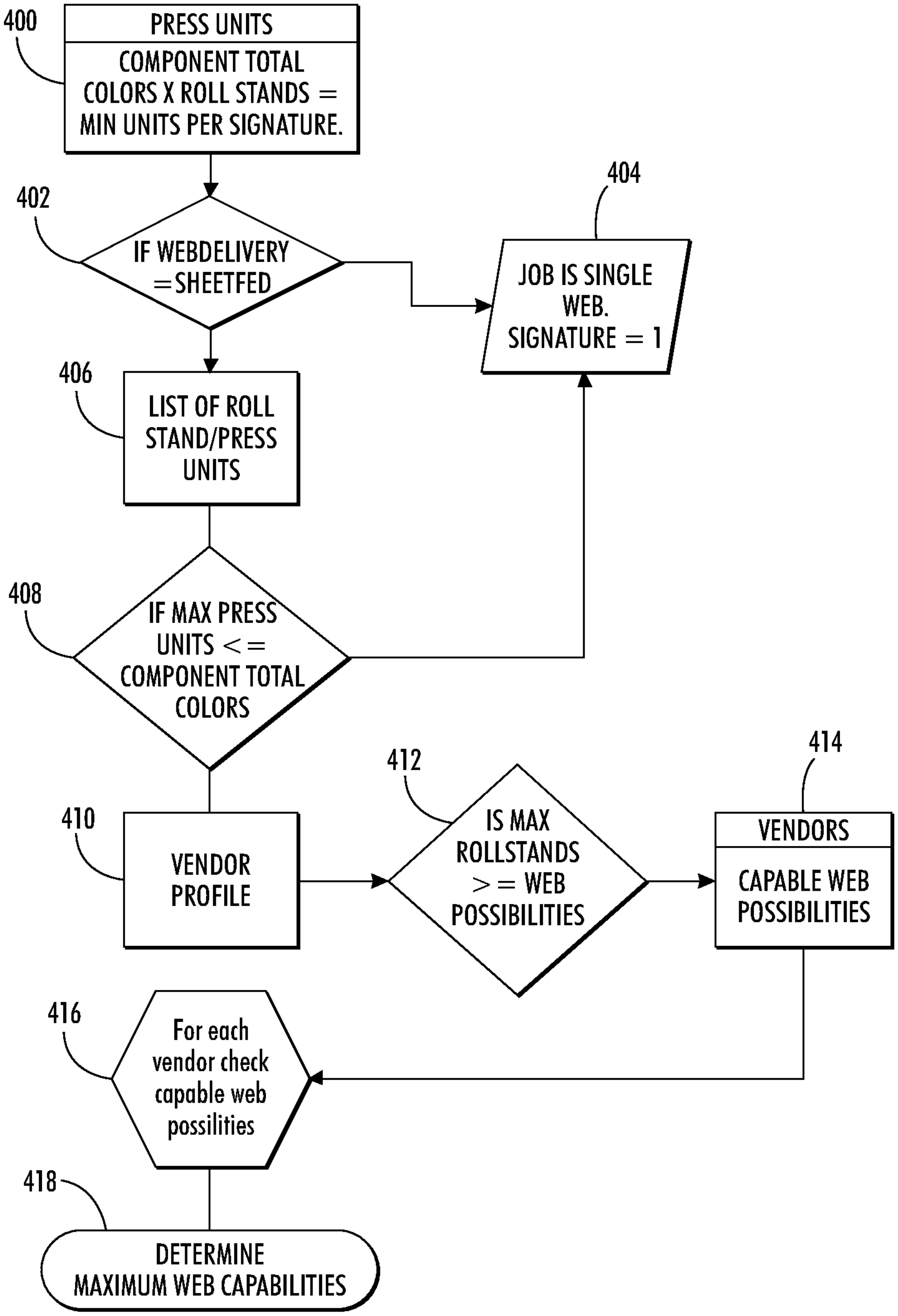
FIG. 5 is a flow diagram illustrating aspects of embodiments herein.

While certain characteristics and specifications are mentioned in FIG. 4, those ordinarily skilled in the art would understand that the embodiments herein are not strictly limited to such characteristics and specifications. Instead, the embodiments herein are applicable to all characteristics and specifications that may be associated with web press printing environments, whether currently known or developed in the future FIG. 5 is a flow diagram illustrating one process that the embodiments herein use to determine if a printing organization has enough available press units for a printing request received from a print customer. More specifically, in item 400, the total number of component colors of the printing request is multiplied by the number of roll stands required by the printing request to determine the minimum number of printing units that will be needed per signature.

Item 402 determines whether the web being delivered is in sheetfeed form (individual sheets of media as opposed to a continuous roll of media). If so, in item 404, the job is identified as a single web, with a signature of one printing unit needed. If not, then there is a list of web roll stands and press units (printing units) as shown in item 406. In item 408, if the maximum number of printing units is less than or equal to the total number of component colors, the job is again a single web job with a signature of one printing units needed (item 404).

If the maximum number of printing units is greater than the total number of component colors, multiple rolls and 4/4 multiple printing units will be needed and the vendor profiles are accessed in item 410. In item 412, the embodiments determine whether the maximum number of roll stands maintained by each printing organization is greater than or equal to the number of webs that could possibly be needed by the printing request received from the print customer to identify vendors (printing organizations) that are capable of processing the printing request (item 414). The embodiments herein then evaluate each of the printing organizations that are capable of performing the printing request to determine the maximum number of printing organizations that have web capabilities relating to the printing request from the print customer (item 418).

The following examples illustrate the number of web units required for different signatures:

| Examples | Web Max Units × | Roll Stands = | Vendor WebTotalColor Capacity Per Signature |
|---|---|---|---|
| 2 Towers, 1 Roll Stand | 2 | 1 | 2 |
| 3 Towers, 1 Roll Stand | 3 | 1 | 3 |
| 4 Towers, 1 Roll Stand | 4 | 1 | 4 |
| 5 Towers, 1 Roll Stand | 5 | 1 | 5 |
| 6 Towers, 1 Roll Stand | 6 | 1 | 6 |
| 7 Towers, 1 Roll Stand | 7 | 1 | 7 |
| 8 Towers, 1 Roll Stand | 8 | 1 | 8 |

If JobTotalWebColors is greater than WebMaxUnits then the vendor would be classified as being incapable.

| 32 pg, 2/2 | | | | |
|---|---|---|---|---|
| If supplier has | Pages | Full Web Max pgs per sig | Available Roll Stands | Potential FullSigs |
| 1 roll stand | 32 / | 16 / | 1 = | 2 |
| 2 roll stands | 32 / | 16 / | 2 = | 1 |
| 3 roll stands | 32 / | 16 / | 3 = | 0.66666667 |

This calculates that four web units are needed to run this job if two roll stands are available.

| Rounded Potential Full Sigs | Total Colors × Roll Stands | Job Web Units Required |
|---|---|---|
| 2 × | 2 = | 2 |
| 1 × | 4 = | 4 |
| Incapable × | = | |

Figure 6:
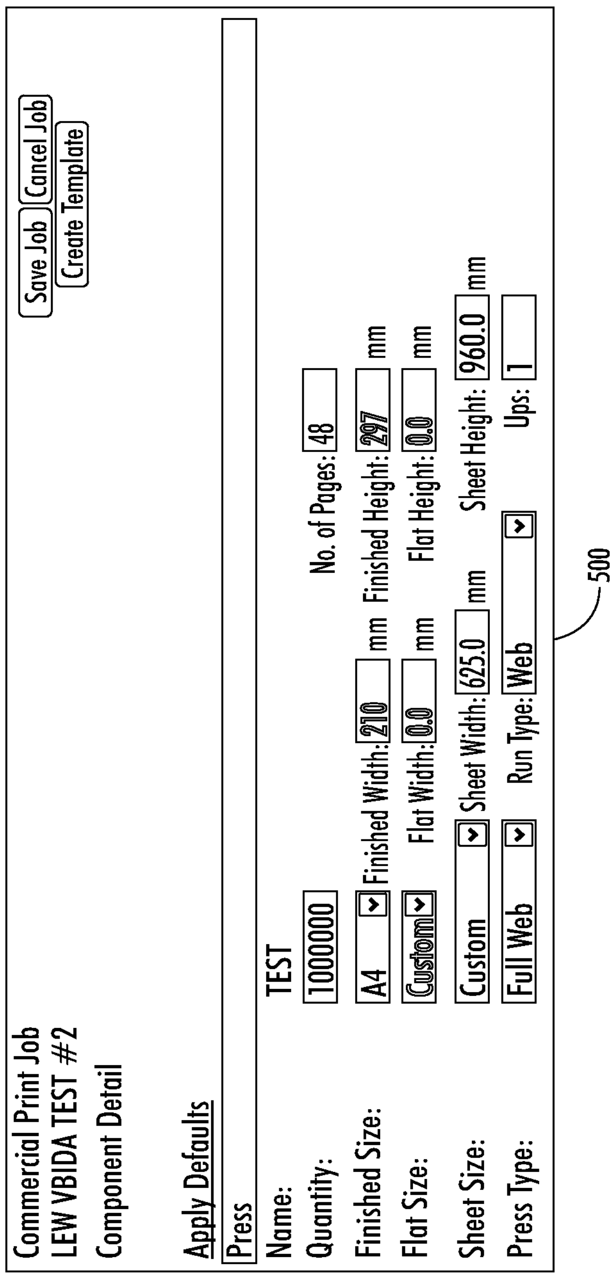
FIG. 6 is a schematic diagram of a graphic user interface according to embodiments herein.
Figure 7:
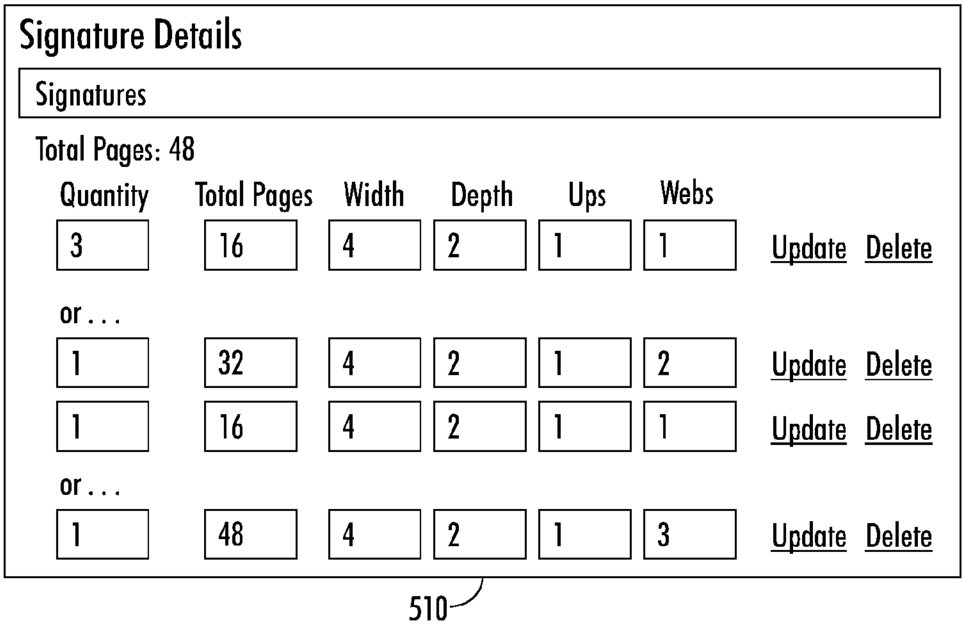
FIG. 7 is a schematic diagram of a graphic user interface according to embodiments herein.

FIG. 6 illustrates another graphic user interface 500 that can be utilized by embodiments herein to allow the print customer to provide information about the printing request. More specifically, graphic user interface 500 includes fields for name, quantity, finished size, finished width, finished height, flat size, flat width, flat height, sheet size, sheet width, sheet height, press type, run type, units per signature, etc. FIG. 7 illustrates another graphic user interface 510 used for signature details. More specifically, the user interface 510 includes fields for total pages, total signatures, quantity, total pages, width, depth, units per signature, webs, etc.

Figure 8:
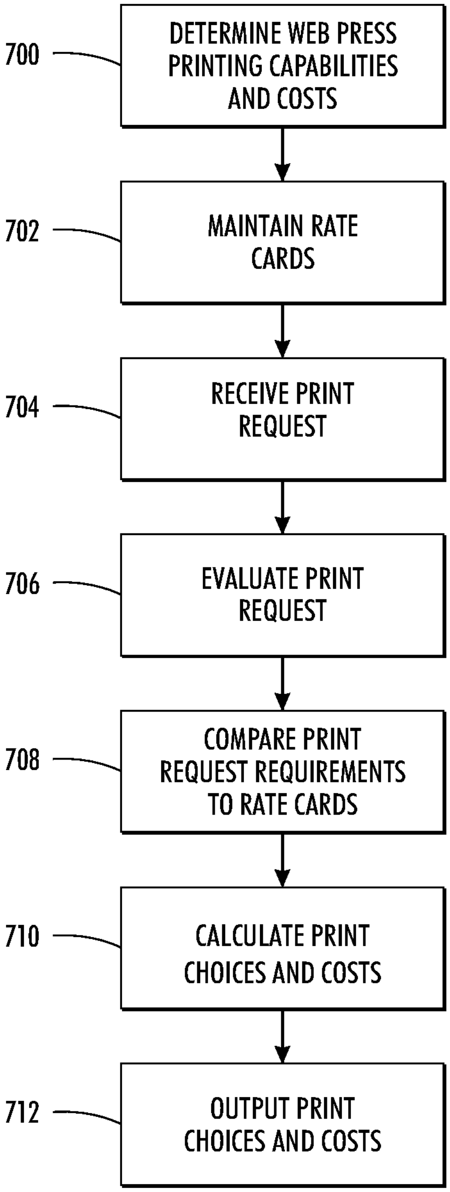
FIG. 8 is a flow diagram illustrating aspects of embodiments herein.

FIG. 8 illustrates an exemplary method embodiment herein in flowchart form. The machine-implemented method starts in item 700 by determining web press printing capabilities and costs of different printing organizations using a processor. The printing capabilities comprise the number of printing units and the associated number of supply roll stands that supply continuous print media to the printing units. Such information can be supplied by printing organizations using, for example, the graphic user interface 200 shown in FIG. 3, or any other similarly functioning computerized interface.

In alternative embodiments, rather than requiring manual entry of such information, the embodiments herein can establish automated communications between the printing units maintained by various printing organizations. Thus, each individual printing unit and roll stand can (through wired or wireless connections) provide a status update as to its availability, functionality, performance capabilities, etc. Therefore, the methods herein can determine the real time web press printing capabilities using an automated interactive communication system established between the printing units, the supply roll stands, and the processor. The method maintains such printing capabilities and costs of the different printing organizations as rate cards within a computer-readable storage medium operatively connected to the processor, as shown in item 702.

The method can then receive a printing request from a print customer through a graphic user interface operatively connected to the processor (such as the graphic user interfaces 500, 510 illustrated in FIGS. 6 and 7) in item 704. In item 706, the method automatically evaluates the printing request using the processor to determine printing request requirements. Such printing request requirements comprise the number of colors to be printed, the number of pages to be printed, the page size, the media type, etc. In item 708, the method automatically compares the printing request requirements with the rate cards (using, for example, a physical or logical comparator operatively connected to or within the processor) to identify capable printing organizations that have the ability to process the printing request, from the list of all potential different printing organizations.

In item 710, the method automatically calculates different print choices and costs based on the rate cards of the capable printing organizations (using the processor). The different print choices can include different print qualities, different completion times, different printing widths, different printing run lengths, different numbers of print colors, and different finishing options for the print job. Each of the printing units only prints a single color at a time. By using different combinations of multiple printing units and multiple supply rolls many colors can be printed in a single production run. For example, two different printing configurations are illustrated in FIGS. 1 and 2, using the same equipment. The embodiments herein consider all possible configurations that each printing organization may possibly adopt to establish many different print choices available to the print customer. The method calculates the different print choices considering different combinations of the printing units and the supply roll stands. In item 712, the method automatically outputs the different print choices and costs to the print customer through the graphic user interface or any other similar output device.

Figure 9:
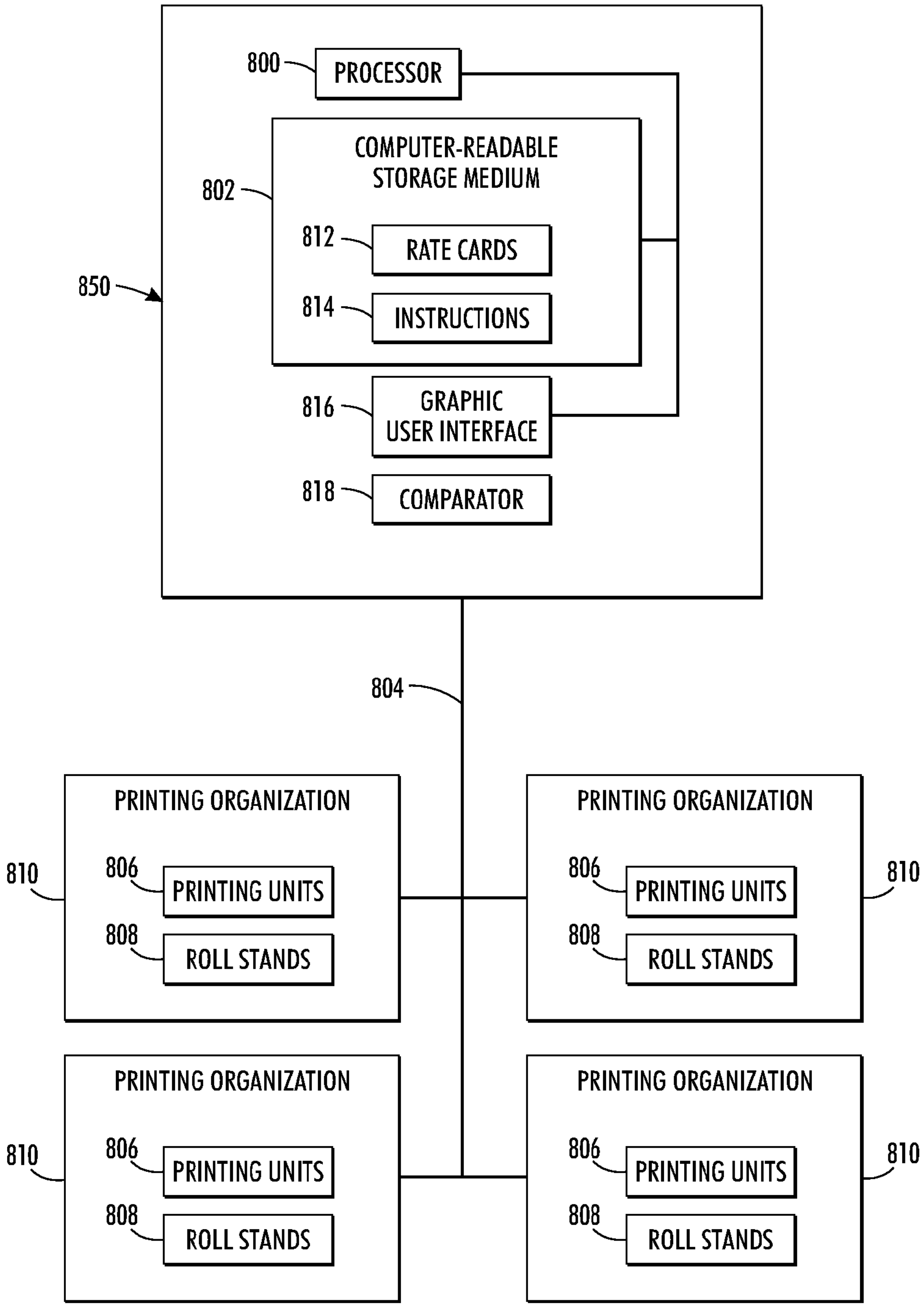
FIG. 9 is a schematic diagram of a system embodiment herein.

Apparatus embodiments are also utilized herein. One such apparatus 850 (which can comprise a single special purpose computerized device, a general purpose computerized device, or many separate devices) is illustrated in FIG. 9. The apparatus includes a processor 800 that determines the web press printing capabilities and costs of the different printing organizations. The processor 800 can determine the web press printing capabilities through an automated interactive communication system 804 connecting the printing units 806 and the supply roll stands 808 of the printing organizations 810, and the processor 800. The communication system 804 can be a wired or wireless system and can include local and wide area networks, such as the Internet. Note that printing units 806 are the same as printing units 108, 110, 112, 114 illustrated in FIGS. 1 in 2, discussed above, and that the supply roll stands 808 are the same as the supply roll stands 100, 102, also illustrated in FIGS. 1 and 2, discussed above.

As mentioned above, the printing organization's ability can be manually supplied through a graphic user interface (FIG. 3) or can be maintained automatically in real time through the utilization of the communication system 804. Again, the communication system 804 allows the different printing units 806 and supply roll stands 802 to directly communicate with the processor 800 and provide their availability, functionality, performance, capabilities, etc. Therefore, for example, if a printing organization 810 purchases additional printing units 806 or if certain printing units are taken out of service (temporarily or permanently) the processor 800 would immediately be updated with such information to automatically maintain the abilities of the different printing organizations in real time.

A computer-readable storage medium 802 is operatively connected to (directly or indirectly connected to) the processor 800. The computer-readable storage medium 802 maintains the printing capabilities and costs of the different printing organizations 810 as rate cards 812. The computer-readable storage medium 802 also contains instructions 814 (that can be stored as computer code) that the processor 800 executes to perform the processes described herein.

A graphic user interface 816 is operatively connected to the processor 800. The graphic user interface 816 receives the printing request from a print customer (as shown above with respect to FIGS. 6 and 7). The processor 800 automatically evaluates the printing request to determine the printing request requirements. A physical or logical comparator 818 is also operatively connected to or maintained within the processor. The comparator 818 automatically compares the printing request requirements with the rate cards to identify ones of the different printing organizations 810 that have abilities to process the printing request as capable printing organizations.

The processor 800 automatically calculates different print choices and costs based on the rate cards 812 of the capable printing organizations 810. The printing organizations 810 can also provide manual rate feedback in response to the printing request in a reverse auction process. The processor 800 and/or printing organizations 810 calculate such different print choices and costs by considering different combinations of the printing units 806 and the supply roll stands 808. The graphic user interface 816 automatically outputs such different print choices and costs to the print customer.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such processors commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A machine-implemented method comprising:

determining web press printing capabilities and costs of different printing organizations using a processor and an automated interactive communication system established between printing units, said printing capabilities comprising a number of printing units, a number of supply roll stands supplying continuous print media to said printing units, and a size of a drum of each of said printing units;

receiving a printing request from a print customer through a graphic user interface operatively connected to said processor;

evaluating said printing request using said processor to determine printing request requirements, said determining of said web press printing capabilities and costs comprising calculating a total color capacity per signature for each of said different printing organizations, each signature of said total color capacity per signature being based on a number of pages each said drum of said printing units can print, said number of pages each said drum can print being based on a page size of said printing request and said size of each said drum, and said total color capacity of said total color capacity per signature for said each of said printing organizations equaling said number of said printing units operated by said each of said printing organizations multiplied by said number of supply stands operated by said each of said printing organizations;

comparing said printing request requirements with said printing capabilities and costs using a comparator operatively connected to said processor to identify capable printing organizations of said different printing organizations that have abilities to process said printing request, said comparing comprising comparing said total color capacity per signature for each of said different printing organizations with a color capacity per signature requirement of said printing request;

calculating different print choices and costs based on said printing capabilities and costs of said capable printing organizations using said processor, said calculating different print choices and costs comprising calculating multiple costs for at least one of said printing organizations based on different combinations of said printing units and said supply stands operated by said at least one of said printing organizations; and outputting said different print choices and costs to said print customer through said graphic user interface.

2. The machine-implemented method according to claim 1, said determining of said web press printing capabilities comprising an automated interactive communication between said printing units, said supply roll stands and said processor.

3. The machine-implemented method according to claim 1, said different print choices comprising different print qualities, different completion times, different printing widths, different printing run lengths, different numbers of print colors, and different finishing options.

4. The machine-implemented method according to claim 1, each of said printing units printing a single color at a time.

5. A machine-implemented method comprising:

determining web press printing capabilities and costs of different printing organizations through manual entry using a processor, said printing capabilities comprising a number of printing units, a number of supply roll stands supplying continuous print media to said printing units, and a size of a drum of each of said printing units;

maintaining said printing capabilities and costs of said different printing organizations as rate cards within a non-transitory computer-readable storage medium operatively connected to said processor;

automatically evaluating a printing request using said processor to determine printing request requirements, said printing request requirements comprising a number of colors to be printed and a number of pages to be printed, said determining of said web press printing capabilities and costs comprising calculating a total color capacity per signature for each of said different printing organizations, each signature of said total color capacity per signature being based on a number of pages each said drum of said printing units can print, said number of pages each said drum can print being based on a page size of said printing request and said size of each said drum, and said total color capacity of said total color capacity per signature for said each of said printing organizations equaling said number of said printing units operated by said each of said printing organizations multiplied by said number of supply stands operated by said each of said printing organizations;

automatically comparing said printing request requirements with said rate cards using a comparator operatively connected to said processor to identify capable printing organizations of said different printing organizations that have abilities to process said printing request, said comparing comprising comparing said total color capacity per signature for each of said different printing organizations with a color capacity per signature requirement of said printing request;

automatically calculating different print choices and costs based on said rate cards of said capable printing organizations using said processor, said calculating different print choices and costs comprising calculating multiple costs for at least one of said printing organizations based on different combinations of said printing units and said supply stands operated by said at least one of said printing organizations; and automatically outputting said different print choices and costs from said processor.

6. The machine-implemented method according to claim 5, said determining of said web press printing capabilities comprising an automated interactive communication between said printing units, said supply roll stands and said processor.

7. The machine-implemented method according to claim 5, said different print choices comprising different print qualities, different completion times, different printing widths, different printing run lengths, different numbers of print colors, and different finishing options.

8. The machine-implemented method according to claim 5, each of said printing units printing a single color at a time.

9. An apparatus comprising:

a processor determining web press printing capabilities and costs of different printing organizations through manual entry, said printing capabilities comprising a number of printing units, an associated number of supply roll stands supplying continuous print media to said printing units, and a size of a drum of each of said printing units;

a non-transitory computer-readable storage medium operatively connected to said processor, said non-transitory computer-readable storage medium maintaining said printing capabilities and costs of said different printing organizations as rate cards;

a graphic user interface operatively connected to said processor, said graphic user interface receiving a printing request from a print customer, said processor automatically evaluating said printing request to determine printing request requirements, said printing request requirements comprising a number of colors to be printed and a number of pages to be printed, said determining of said web press printing capabilities and costs comprising calculating a total color capacity per signature for each of said different printing organizations, each signature of said total color capacity per signature being based on a number of pages each said drum of said printing units can print, said number of pages each said drum can print being based on a page size of said printing request and said size of each said drum, and said total color capacity of said total color capacity per signature for said each of said printing organizations equaling said number of said printing units operated by said each of said printing organizations multiplied by said number of supply stands operated by said each of said printing organizations; and a comparator operatively connected to said processor, said comparator automatically comparing said printing request requirements with said rate cards to identify capable printing organizations of said different printing organizations that have abilities to process said printing request, said comparing comprising comparing said total color capacity per signature for each of said different printing organizations with a color capacity per signature requirement of said printing request;

said processor automatically calculating different print choices and costs based on said rate cards of said capable printing organizations, said calculating different print choices and costs comprising calculating multiple costs for at least one of said printing organizations based on different combinations of said printing units and said supply stands operated by said at least one of said printing organizations; and said graphic user interface automatically outputting said different print choices and costs to said print customer.

10. The apparatus according to claim 9, said processor determining said web press printing capabilities through an automated interactive communication system between said printing units, said supply roll stands and said processor.

11. The apparatus according to claim 9, said different print choices comprising different print qualities, different completion times, different printing widths, different printing run lengths, different numbers of print colors, and different finishing options.

12. The apparatus according to claim 9, each of said printing units printing a single color at a time.

* * * * *